Patented Dec. 6, 1949

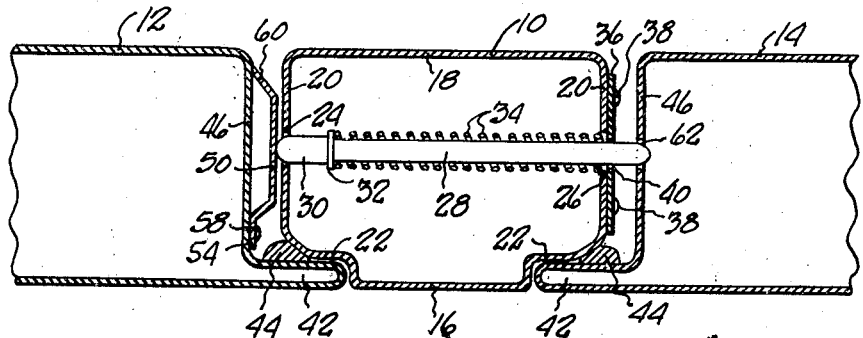
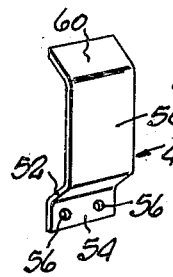
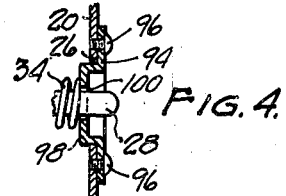
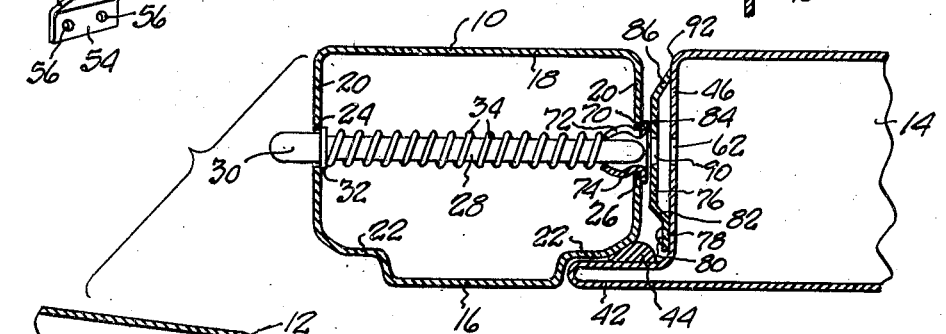
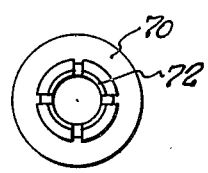
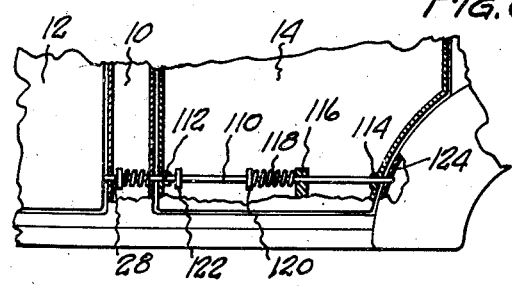
Earl N. Dickson.
INVENTOR.
BY *Altsch & Knoblock*
ATTORNEYS.

2,490,213

UNITED STATES PATENT OFFICE 2,490,213

AUTOMOBILE DOOR LATCH

Earl N. Dickson, Mishawaka, Ind.

Application September 27, 1946, Serial No. 699,600

3 Claims. (Cl. 292—182)

This invention relates to improvements in automobile door latches, and particularly to a latch for locking the rear doors of automobiles, which is so constructed as to be automatically operated whenever the adjacent front door is closed.

Automobiles of the sedan or four-door type present a safety problem to users having small children when the child or children ride in the back seat of the car without an adult companion also seated in the rear of the car, by virtue of the fact that the child or children may play in the rear compartment of the automobile and in so doing operate the usual door latch, with the result that the door may be released and opened by the child while an automobile is moving. The danger of this condition has been long recognized and various attempts have been made to solve it. Such previous attempts have generally been unsuccessful for various reasons, including the necessity of special manipulation of the lock, the difficulty of applying an automatic lock, and the danger of breakage or jamming of an automatic lock if a rear door is closed while the front door holds the latching device automatically in latching position. Therefore, it is the primary object of this invention to provide a device of the character aforesaid which overcomes the difficulties hereinabove mentioned, and which satisfactorily accomplishes the safe automatic locking of a rear door when the automobile is in motion.

Another object of the invention is to provide a device of this character which can be installed easily and quickly in any automobile by the use of simple tools and without the necessity of disassembling any parts of the automobile.

A further object is to provide a device of this character which is so constructed and has its parts so arranged that the rear door may be closed while the latching mechanism is in latching position without danger of jamming or breaking the latching mechanism.

Other objects will be apparent from the following specification.

In the drawing:

Fig. 1 is a horizontal transverse sectional view illustrating the application of the latching device to an automobile.

Fig. 2 is a horizontal transverse sectional detail view of a modified embodiment of the invention, illustrating the front door in open position.

Fig. 3 is an end view of a fitting used in the Fig. 2 embodiment of the invention.

Fig. 4 is a fragmentary detail sectional view, illustrating a modified form of a fitting usable in applicant's construction.

Fig. 5 is a perspective view of the striker plate used in applicant's device.

Fig. 6 is a fragmentary side view of a modified embodiment of the invention with parts shown in vertical section.

Referring to the drawing, and particularly to Fig. 1, which illustrates one embodiment of the invention, the numeral 10 designates the hollow post of an automobile body which is positioned between a front automobile door 12 and a rear automobile door 14 in the manner well understood in the art. The post 10 is customarily formed of hollow construction, having an outer wall 16, an inner wall 18, and end walls 20. The outer wall 16 is preferably inset adjacent its margins at 22. A pair of axially aligned openings are formed in the end walls 20 of the post, the opening 24 adjacent the front door being of smaller size than the opening 26 adjacent the rear door 14.

A latch bolt 28 is positioned to extend through the openings 24 and 26 and is of a length greater than the spacing between the openings 24 and 26. One end portion 30 of the bolt 28 is of a diameter to fit snugly and slidably in the opening 24, and at the inner end of the portion 30 is formed a collar or enlargement 32 which is of a size to abut the inner face of the adjacent wall 20 of the post when the bolt is urged to the left as viewed in Fig. 1. An elongated coil spring 34 encircles the remaining portion of the bolt 28 with its inner end abutting and bearing aaginst the collar 32. The opening 26 is of a diameter to freely receive therethrough both the collar 32 on the bolt and the coil spring around the bolt, whereby said bolt and spring may be inserted with the end portion 30 foremost through the opening 26 and into the opening 24. A retainer plate 36 is secured to the outer face of the wall 20 of the post having the opening 26 formed therein and is secured thereto by metal screws or any other suitable securing means 38. The retainer 36 has an opening 40 formed centrally therein of a size to snugly and slidably receive the right-hand end of the bolt, as viewed in Fig. 1, while at the same time providing an abutment for the outer end of the coil spring 34.

Each of the doors 12 is of the usual construction having a marginal flange portion 42 seating against the post at the offset 22 thereof and mounting a cushioning member 44. This provides a seal which permits the inner edge of wall 46 of the doors to be spaced from the adjacent walls 20 of the post as illustrated, providing adequate clearance for free fitting of the parts. A striker plate 48 of the construction best shown in Fig. 5 is secured by the inner wall 46 of the front door 12. The striker plate is preferably formed of spring metal plate stock and comprises a central body portion 50 from one end of which is bent or offset a part 52 from which projects a terminal flange 54 parallel to and offset from the part 50 and provided with apertures 56 therein for receiving metal screws 58 or other retainers. The opposite end of the striker plate has flange 60 bent angularly therefrom for free engagement with the wall 48 adjacent the inner edge of said wall. The flange 60 may have a beveled edge to bear flush against the outer face of the outer wall 46.

The rear door 14 is provided with a bolt receiving opening 62 formed therein in alignment with the bolt 28 and adapted to receive the same as illustrated in Fig. 1.

It will be observed that by virtue of the construction and arrangement of the parts, and particularly by virtue of the large size of the opening 26, it is a simple matter to install the latch in an automobile. For this purpose it is necessary only to drill the openings 24 and 26 in the door post in alignment and of proper sizes. Thereupon the bolt 28 and spring 34 can be inserted with the portion 30 of the bolt foremost, whereupon the retainer 36 can be passed over the outer right-hand end of the bolt and secured to place by the securing means 38. The bolt is of such a length that when the end of the portion 30 thereof bears against portion 60 of the striker on the front door 12, the opposite end of the bolt will project into the opening 62 in the rear door 14, thereupon locking the rear door positively so that it cannot be swung open. Note in this locking position of the parts that the enlargement or collar 32 of the bolt is spaced inwardly from the wall 20 of the post in which the opening 24 is formed. This clearance marks the amount of play or longitudinal movement which the bolt may have toward the left, as viewed in Fig. 1, when the front door 12 is opened. In other words, when the front door 12 is opened, the spring 34 urges the bolt to the left until the enlargement 32 strikes the wall 20, and in this position the opposite end of the bolt is moved clear of the end wall 46 of the door 14 so that the rear door is released from the latching action of the bolt. The length of the part 30 of the bolt is preferably such that when the collar 32 bears against the wall 20, it extends in the path of the striker plate 48 when the front door is moved from open to closed position. In other words, the inclined flange 60 of the striker plate 48 strikes a projecting end or nose 30 of the bolt and the inclination of the flange 60 serves progressively to shift the bolt longitudinally and bodily toward the right as viewed in Fig. 1.

An alternative embodiment of the invention is illustrated in Fig. 2. This construction is characterized by the same relation and proportion of the sizes of the openings 24 and 26 in the post 10 as in the preferred embodiment. However, a different type of retainer is employed in this embodiment, said retainer being of the construction best illustrated in Fig. 3 and comprises an annular end wall 70 of a size to bear against the outer face of the post wall 20 around the opening 26. From the inner margin of this ring project a plurality of longitudinally extending resilient fingers 72 whose inner margin at their free ends cooperate to define segments of a guide passage of a size to snugly but slidably receive the bolt 28. The fingers 72 are preferably bent longitudinally to provide shoulders 74 intermediate their length of a diameter greater than the diameter of the opening 26. Consequently, this retainer is self-locking and can be installed simply by inserting the fingers 72 through the openings 26, which action is accommodated by their resilience and their spacing. As the fingers 72 are pressed home to a point wherein the inner face of the annular portion 70 abuts the outer surface of the post wall 20, the intermediate enlarged or offset portions 74 of the fingers will have snapped past the opening, thereby providing a resilient latch retaining the unit in place. This construction has the advantage of eliminating the necessity of using metal screws or other fastening means for securing the retainer in place. Additionally, it will be apparent that the abutment of the outer end of the coil spring 34 against the inner ends of the fingers 72 serves to provide both an abutment against which the spring 34 may be pressed when the bolt is shifted toward the right, as viewed in Fig. 1, and additionally causes pressure of the shoulder 74 against the wall 20 of the post to hold the retainer member under tension.

In the construction illustrated in Fig. 2, a striker plate 76 of the same general construction as the striker plate illustrated in Fig. 5 is mounted upon the edge wall 46 of the rear door 14. Specifically, this striker plate comprises an end flange 78 adapted to be secured in abutment with the wall 46 of the door 14 adjacent the projecting flange 42 of the door by means of a metal screw or other securing member 78. The striker plate is bent or offset outwardly at 82, and the central portion 84 thereof extends parallel to the door wall 46 and spaced therefrom. The end 86 of the striker plate comprises a flange bent angularly from the portion 84 and adapted to bear at its free end against the wall 46 adjacent the inner edge of the wall 46. An opening 90 is formed in the portion 84 of the striker plate 76 of substantially the same diameter as the opening 62 in the door wall 46 and axially aligned therewith.

When two striker plates are provided upon the front and rear doors respectively, specifically the striker plate 48 upon the front door, and the striker plate 76 upon the rear door, all of the advantages mentioned above with respect to the Fig. 1 embodiment are provided and certain additional advantages. In other words, the normal operation of the latch, as described above with reference to Fig. 1, is the same in the Fig. 2 embodiment. The additional advantage accomplished resides in the fact that this construction makes possible the closing of the rear door 14 while the latch bolt 28 is in its latching position, held in that position by the engagement of its end portion 30 with the striker plate 48 upon the front door 12 when the latter is closed. Note in this connection that, assuming the bolt 28 to be in latching position projecting to the right, from the position illustrated in Fig. 2, that is, in a position similar to that illustrated in Fig. 1, while the rear door is open, any movement of the rear door to closing position causes the right-hand end of the bolt, as viewed in Fig. 2, to be engaged by the curved corner 92 of the door to apply a pressure to the left as viewed in Fig. 2, which tends to deflect the striker plate 48.

Continued closing movement of the rear door 14 brings the bolt into engagement with the inclined flange 86 of the striker plate 76, thereupon continuing the application of deflecting pressure to the striker plate 48 and simultaneously applying deflecting pressure to the striker plate 76. The deflection of the resilient striker plates 48 and 76 continues as the right-hand end of the bolt traverses the striker plate until it reaches the opening 90. As soon as it reaches the opening 90 the bolt is free to move bodily to the right from the position illustrated in Fig. 2, thereby releasing the spring tension applied to the two striker plates and shifting the bolt to its door locking position. Thereafter, the rear door will remain latched until the front door 12 has been opened to permit the spring 34 to shift to the position shown in Fig. 2 clear of both the end wall 46 of the door 14 and the striker plate 76 mounted upon that wall. It will be observed that this construction applies deflecting pressure to two resilient striker plates 48 and 76 and thereby reduces the amount of deflection which must be sustained by either one of the striker plates considered individually. Stated differently, by the use of the two striker plates the latching bolt 28 is caused to assume a position intermediate the positions illustrated in Figs. 1 and 2 during the operation of closing the rear door while the front door is closed, and, therefore, danger of breakage of the bolt or of permanent bending of the striker plates is avoided.

A modified construction of the retainer for the bolt is illustrated in Fig. 4. This construction illustrates the use of a plate 94 secured to the outer face of the wall 20 having the large opening 26 by metal screws 96 or other suitable securing means. The central portion of the plate 94 has a cup-shaped offset member 98 formed therein of a diameter to fit within the opening 26. The diameter of the cup-shaped part may be slightly less than the diameter of the opening 26 to accommodate positioning of the member 94 to accurately center the member 98 with respect to the opening 24 and the opposite post wall in the event the openings 24 and 26 are not accurately aligned or exactly coaxial. The central portion of the cup-shaped projection 98 is provided with an opening 100 of a size to snugly and slidably receive the bolt 28 while at the same time providing an effective abutment for the coil spring 34.

The constructions hereinabove described all are applicable to automobiles in which the free edge of the rear door 14 extends adjacent to the post 10. Likewise, as illustrated, it is assumed that the free edge of the front door 12 is positioned adjacent the post 10. The requirement that the front door swing in this manner is not critical and it will be apparent that a front door construction hinged to post 10 will serve as well to control the bolt 28 as in the construction specifically illustrated. In such instances the use of the striker plate 48 is desirable, although it will be apparent that in such cases the shape of the striker plate may be altered inasmuch as the need for the inclined flange 60 thereof is not critical for such an installation. Also, the application of the invention is not limited to automobiles whose rear doors open at their front edges. Thus, an embodiment of the invention in which the rear door is hinged at its front edge has been illustrated in Fig. 6.

In the Fig. 6 construction, the same bolt end spring assembly, slidable and spring pressed in the post 10, as in the previously described constructions, is provided. The rear door 14 assumed to be hinged at its front edge to the post 10 has an elongated rod 110 extending substantially horizontally therethrough for alignment with the bolt 28 in the post 10 when the rear door is closed. The bolt 110 is slidably supported at its front end by a fitting 112 which may be of the construction of the fittings illustrated in Figs. 1, 3 and 4 and is likewise secured at its rear edge by a similar fitting 114 or in any other suitable manner. The bolt is adapted to pass through openings in the door at its front and rear edges as will be understood. Intermediate its ends a bracket 116 is provided in the door as a further support for the elongated rod 110 and as an abutment for a coil spring 118 whose forward end bears against a shoulder 120 on the bolt 110. A shoulder 122 is formed on the bolt 110 to limit the movement of said bolt to the left as viewed in Fig. 6 so that the outer end of said bolt will terminate clear of the post 10 when the bolt is in its spring pressed position. The frame portion 124 of the automobile adjacent to the rear edge of the door 14 is provided with an opening to receive the right-hand end of the bolt 110 as viewed in Fig. 6.

The locked arrangement of the parts is illustrated in Fig. 6, in which it will be observed that when the door 12 is closed the bolt 28 will be urged to the right from its normal spring pressed position and will press against the end of the bolt 110 when the rear door 14 is closed, thereby urging the bolt 110 to the position shown in the drawing at which the right hand end of said bolt fits in the auto frame part 124 to lock the rear free edge of the door and prevent the rear door 14 from being opened. When the front door 12 is opened the bolt 28 will be spring pressed toward the left to an extent permitting travel of the bolt 110 to the left under the influence of the spring 118 to an extent which will permit the right hand end of the bolt 110 to clear the opening in the member 124 and which will position the left hand end of the bolt 110 outwardly of the door 14 and clear of the post 10 for freedom of rotation of these parts. While the construction shown includes the bracket 116 which is of advantage because of the length of the rod 110, the use of such a bracket 116 is not essential if the bolt 110 is formed of rod or tube stock of sufficient strength to maintain a straight unbent form in the use of the device. The introduction of the member 116 requires removal of some of the door elements for access to the interior of the door and is therefore less desirable than constructions wherein the rod 110 is strong enough to eliminate need for intermediate support. It will be understood that in cases where the support 116 is not used, the spring 118 will bear against the fitting 114 and that the collar 120 on the bolt 110 may be positioned nearer the right hand end of the bolt 110 than is illustrated to minimize the length of the spring 118 which is required in the device.

While various forms of the invention have been described and illustrated herein, it will be understood that they are illustrative only and not limiting and that changes in the construction may be made within the scope of the appended claims without departing from the spirit of the invention.

I claim:

1. A rear door latch for an automobile having a front door, a rear door having a bolt receiving aperture, and a hollow post between said doors having horizontally aligned openings therein, comprising a bolt adapted to extend through said openings and having a post-engaging enlargement adjacent one end thereof and within said post, a coil spring encircling said bolt and normally urging said bolt toward said front door, a bolt depressing striker plate adapted to be secured to the edge of the front door to extend transversely thereof and positioned between said door and post, said bolt being longer than the spacing between said striker plate and the edge of said apertured door, said striker plate being resilient and having a securing flange at one end thereof adapted to be positioned adjacent the outer face of the door, a central portion offset from said flange, and an opposite end flange inclined angularly inwardly from said central portion to engage said door adjacent to one face of the door.

2. The device of claim 1 with a bolt retaining plate adapted to be attached to said post over one of said aligned openings, said plate having spring fingers adapted to catch on the edges of said latter opening.

3. A rear door latch for an automobile having a front door and a rear door and a hollow post between said doors having horizontally aligned openings therein, comprising a bolt adapted to extend through said openings and having a post engaging enlargement adjacent one end thereof and within the post, a coil spring encircling said bolt and normally urging said bolt toward said front door, a bolt depressing striker plate of thin resilient plate stock comprising an arched body portion having an attaching flange which is adapted to be clamped to the front door edge to bring the arched body portion into register with the bolt and to lie between the said front door edge and the post, a bolt depressing striker and locking plate of thin resilient plate stock comprising an arched body portion with a bolt receiving opening therein, and having an attaching flange adapted to be clamped to the rear door edge to bring the arched body portion into register with the bolt and to lie between the said rear door edge and the post, said bolt being longer than the spacing between the striker plate on the front door and the striker and locking plate on the rear door, whereby when the doors are closed, the bolt projects into the opening in the arched body portion of said second plate.

EARL N. DICKSON.

REFERENCES CITED

The following references are of record in the file of this patent:

UNITED STATES PATENTS

| Number | Name | Date |
|---|---|---|
| 2,003,394 | Sell | June 4, 1935 |
| 2,261,674 | Davelaar | Nov. 4, 1941 |

FOREIGN PATENTS

| Number | Country | Date |
|---|---|---|
| 422,489 | Great Britain | Jan. 14, 1935 |